US007050755B2

(12) United States Patent
Kline

(10) Patent No.: US 7,050,755 B2
(45) Date of Patent: May 23, 2006

(54) TARGETED MOBILE TERMINAL COMMUNICATION BLOCKER

(75) Inventor: Paul A. Kline, Gaithersburg, MD (US)

(73) Assignee: PCTEL Maryland, Inc., Germantown, MD (US)

( * ) Notice: Subject to any disclaimer, the term of this patent is extended or adjusted under 35 U.S.C. 154(b) by 422 days.

(21) Appl. No.: 10/348,697

(22) Filed: Jan. 22, 2003

(65) Prior Publication Data

US 2003/0143943 A1 Jul. 31, 2003

Related U.S. Application Data

(60) Provisional application No. 60/352,001, filed on Jan. 24, 2002.

(51) Int. Cl.
*H04K 3/00* (2006.01)

(52) U.S. Cl. ................... 455/1; 455/404.1; 455/456.1
(58) Field of Classification Search ............ 455/1, 455/404.1, 404.2, 103, 456.1; 380/270
See application file for complete search history.

(56) References Cited

U.S. PATENT DOCUMENTS

| 5,001,771 | A | * | 3/1991 | New ........................... 455/1 |
| 5,083,111 | A | * | 1/1992 | Drucker et al. .......... 340/572.1 |
| 5,373,300 | A | * | 12/1994 | Jenness et al. .............. 343/702 |
| 5,655,019 | A | * | 8/1997 | McKernan et al. ............ 455/1 |
| 5,670,742 | A | * | 9/1997 | Jones ....................... 174/35 R |
| 6,085,096 | A | * | 7/2000 | Nakamura ................ 455/456.6 |
| 6,195,529 | B1 | * | 2/2001 | Linz et al. ..................... 455/1 |
| 6,456,822 | B1 | * | 9/2002 | Gofman et al. ................ 455/1 |
| 6,701,160 | B1 | * | 3/2004 | Pinder et al. ............ 455/550.1 |
| 2001/0036821 | A1 | * | 11/2001 | Gainsboro et al. .......... 455/410 |

* cited by examiner

*Primary Examiner*—Tilahun Gesesse
(74) *Attorney, Agent, or Firm*—Roberts, Abokhair & Mardula, LLC

(57) ABSTRACT

A selective blocker for targeted mobile terminals. A signal monitor determines when a targeted mobile terminal is transmitting a signal to a base station. A signal analyzer identifies characteristics of the terminal signal and a processor produces a blocking response based on one or more characteristics. The blocking response is transmitted to the targeted mobile terminal to block communications between the targeted mobile terminal and the base station using the minimum power needed to effectively block the terminal signal so as to limit interference with non-targeted mobile terminals.

13 Claims, 4 Drawing Sheets

TARGETED MOBILE TERMINAL COMMUNICATION BLOCKER

CROSS REFERENCE TO RELATED APPLICATIONS

This application claims priority under 35 U.S.C. §119(e) from provisional application No. 60/352,001, filed Jan. 24, 2002. The 60/352,001 provisional application is incorporated by reference herein, in its entirety, for all purposes.

FIELD OF INVENTION

This invention relates generally to wireless communication jamming. More particularly, the present invention relates to the blocking of specific wireless terminal signals within a limited area in instances where it is legal to do so or where an exception is provided for the public interest.

BACKGROUND OF THE INVENTION

Cellular phone blockers have been available since 1998. These blockers are used for blocking inbound and outbound cellular phone calls. There are two general methods to block a call: interfere by transmitting at the cellular frequency to be blocked; and by establishing an electronic filter to fool mobile phones that the reverse link is not being responded to, i.e., make it seem that the mobile unit is out of range of the base station.

There are many reasons for blocking cellular transmission. Preventing noise in an area where the cellular phone would be annoying, such as restaurants, theatres, halls, hospitals and libraries. Further, there are some environments were cellular transmission may threaten sensitive instruments such as in hospitals. The literature reports that some Latin American banks routinely block cellular transmission so that spotters within banks cannot communicate to outside henchmen identifying a bank patron who has made a sizable cash withdrawal.

However, radio frequency jamming is illegal in most industrial nations with two exceptions: Israel and Japan. Exceptions are available in other countries for narrow reasons such as public safety and national security. For example, in an environment such as a hospital or airplane where radio transmission may affect instruments critical to safety, blocking of wireless transmission may be granted an exception to a law banning such jamming. In a military, security or police situation, where it is critical to block espionage, terrorist or criminal communication, exceptions may be granted. A manufacturer of cell jamming equipment, Intelligence Support Group (ISG), Ltd., based in China Lake, Calif., sells its equipment only for export, to the military, or to those law enforcement agencies exempted from FCC rules.

ISG describes its product, Cellular Call Blocker, Model: CELL-B, as a device that allows blocking of cellular calls by authorized law enforcement and government agencies by overriding the cellular carriers' control channel signal with a signal from the CELL-B. This forces mobile phones in the target area to a roam mode, thus only responding to the CELL-B control channel signal. The overiding causes all cellular phones in the target area to be jammed.

U.S. patent application Ser. No. 200010036821 filed by Gainsboro et al. entitled, "Computer-Based Method and Apparatus for Controlling, Monitoring, Recording, and Reporting Wireless Communications," (herein, Gainsboro) describes a microprocessor-based method and apparatus for controlling wireless communications (via cellular radiotelephone or some other known means) into or out of a controlled, institutional environment, such as a prison, military base, hospital, school, business or government organization. A radiotelephone interface is provided, with apparatus for detecting and controlling wireless transmissions either by a caller from within the institution or by a caller from outside the institution. The identification of an unauthorized wireless transmission is accomplished through the detection of certain identifying signals, i.e. NPA/JNXX/ESN, or, alternatively, via voice recognition. The system monitors wireless transmissions, tests signals for approval, and enables or prevents the transmissions via jamming or other means. Gainsboro, however, does not teach how such transmissions are to be jammed or provide a means for limiting the jamming transmission so as to minimize interference with non-targeted terminals.

What is desirable is a cellular phone blocker that is selective (i.e., intelligent) in implementation wherein the device operates only when a targeted mobile terminal is attempting to place a call while in a limited area. This way, non-targeted cellular phones are operational within the limited area as long as the targeted cell phone is quiescent.

BRIEF SUMMARY OF THE INVENTION

An embodiment of the present invention is a system and method for selectively blocking wireless communications within a blocking zone. In accordance with this embodiment, a call origination signal is detected from a targeted mobile terminal. An appropriate blocking response that is tailored to the origination signal is determined and a blocking signal comprising the blocking response is transmitted to the targeted mobile terminal. The blocking signal is focused on a blocking zone so as to minimize interference with communications of non-targeted mobile terminals.

It is therefore an aspect of the present invention to selectively block cellular or wireless communications within a blocking zone.

It is another aspect of the present invention to selectively block cellular or wireless communication when a targeted mobile terminal transmits a signal and to stop blocking cellular communication when the targeted mobile terminal ceases transmitting.

It is a further aspect of the present invention to limit cellular or wireless communication blocking within a blocking zone.

It is still another aspect of the present invention to determine the position of the targeted mobile terminal so as to confine cellular blocking to the immediate locale of the targeted mobile terminal.

It is still a further aspect to determine the targeted mobile terminal's frequency of transmission so as to block cellular communications within a narrow range around that frequency.

It is yet another aspect of the present invention to process the targeted mobile terminal transmission to determine a channel and frequency the targeted mobile terminal has dedicated for reception, thus allowing the present invention to narrow blocking activities to specific frequencies and channels.

It is yet a further aspect of the present invention to determine the radio transmission protocol used by the targeted mobile terminal so as to limit any blocking activity to that protocol.

These and other aspects of the present invention will become apparent from a review of the general and detailed descriptions that follow. An embodiment of the present invention is a method for selectively blocking communication within a blocking zone from a targeted mobile terminal to a base station. In accordance with this embodiment, a call origination signal is detected from a targeted mobile terminal. An appropriate blocking response that is tailored to the origination signal is determined and a blocking signal comprising the blocking response is transmitted to the targeted mobile terminal. The blocking signal focused on a blocking zone so as to minimize interference with communications of non-targeted mobile terminals. In an alternate embodiment, a range of probable frequencies of a response signal from the base station is determined and a blocking signal of sufficient power is transmitted at each of the probable frequencies.

Further embodiments of the present invention are designed to minimize impact to the cellular service of mobile terminals near the targeted mobile terminal (thereby reducing the size of the blocking zone). For example, in another embodiment of the present invention, the blocking signal is focused on a blocking zone by determining the location of the targeted mobile terminal and the signal strength needed to block the signal of the targeted mobile terminal. The blocking signal is then transmitted at the blocking signal strength.

In another embodiment, the blocking signal is transmitted from a plurality of transmitters to the call origination signal location such that the cumulative strength of the blocking signal at the call origination signal location from the plurality of transmitters is about the blocking signal strength. The signal strength of the signals from any one of the plurality of transmitters is relatively low, thereby reducing interference outside the blocking zone.

Additionally, signals from the targeted mobile terminal are blocked selectively and on an intermittent basis keyed to a time period when the present invention detects communication activity by the targeted mobile terminal. In this manner, the present invention interferes with select communications while minimizing interference to other non-targeted mobile terminals.

In another embodiment according to the present invention, blocking is accomplished by disabling the targeted mobile terminal's decoder. Disabling the terminal's decoder prevents the targeted mobile terminal (and those non-targeted mobile terminals within the blocking zone that use the same decoding scheme as the targeted mobile terminal) from recognizing a link establishment with the base station. Only the targeted mobile terminal and those non-targeted mobile terminals within the blocking zone using the same decoding scheme as the targeted mobile terminal are affected. Communications of mobile terminals that use a different decoding scheme or are outside the blocking zone are not impacted by the blocking procedures. When the targeted mobile terminal terminates its attempt to establish a communications link, the present invention ceases its blocking activity and the non-targeted mobile terminals within the blocking zone regain their connectivity capacity.

BRIEF DESCRIPTION OF THE DRAWINGS

The invention will be appreciated by review of the following detailed description, in conjunction with viewing of the appended drawing figures.

DETAILED DESCRIPTION

An embodiment of the present invention is a system and method for selectively blocking wireless communications within a blocking zone. In accordance with this embodiment, a call origination signal is detected from a targeted mobile terminal. An appropriate blocking response is determined and a blocking signal comprising the blocking response is transmitted to the targeted mobile terminal. The blocking signal is targeted at a blocking zone so as to minimize interference with communications of non-targeted mobile terminals.

Figure 1:
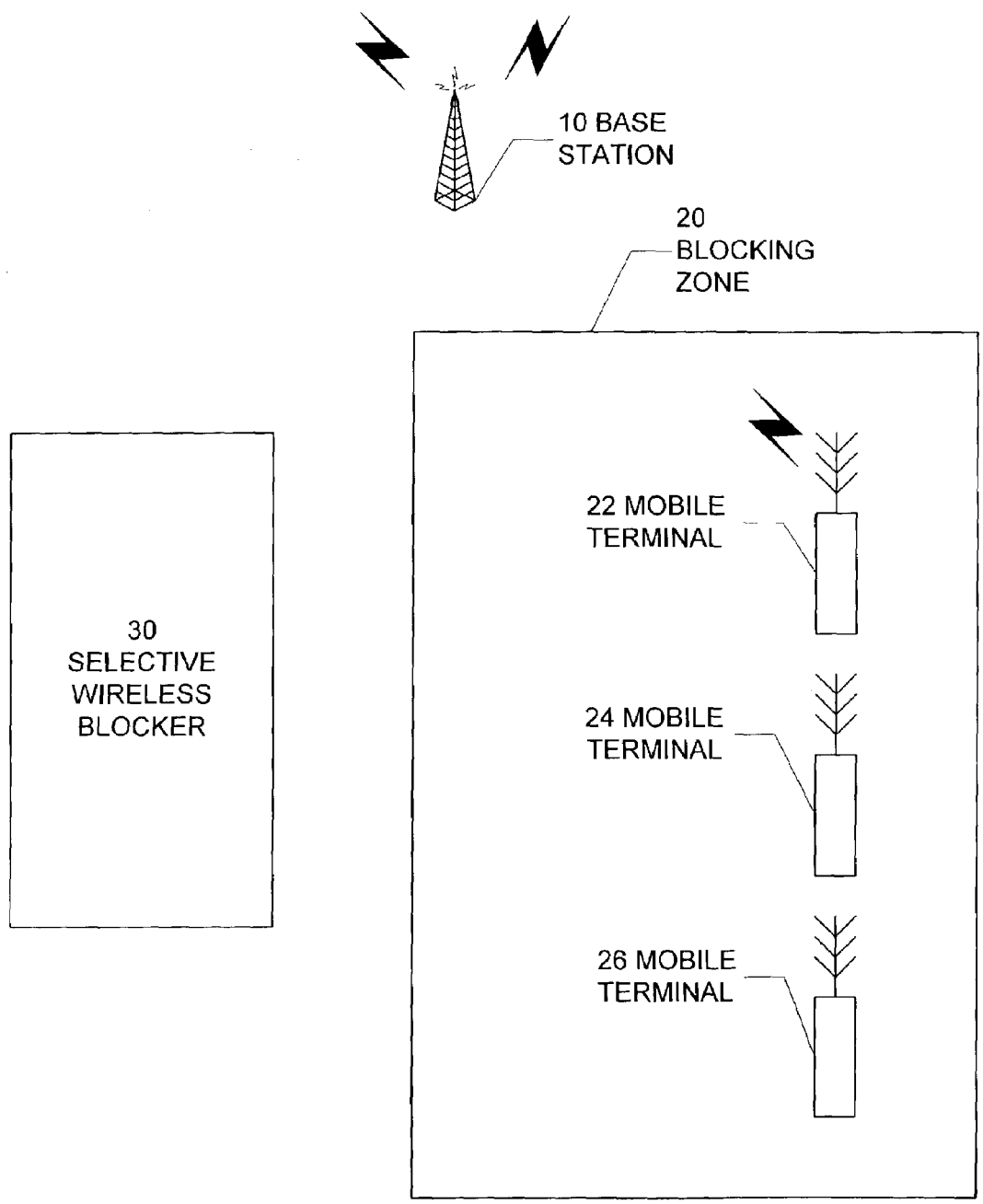
FIG. 1 illustrates mobile terminals within a blocking zone when no blocking is present.

Referring to FIG. 1, three mobile terminals 22, 24 and 26 are located within a blocking zone 20. Mobile terminal 22 is engaged in wireless communication. The targeted mobile terminal 26 is quiescent as is the third terminal 24, a non-targeted mobile terminal. The selective wireless blocker 30 monitors the blocking zone for activity emanating from the targeted mobile terminal 26. A base station 10 is broadcasting multiplexed packets to clients within its geographical domain including wireless terminals within the blocking zone 20.

Figure 2:
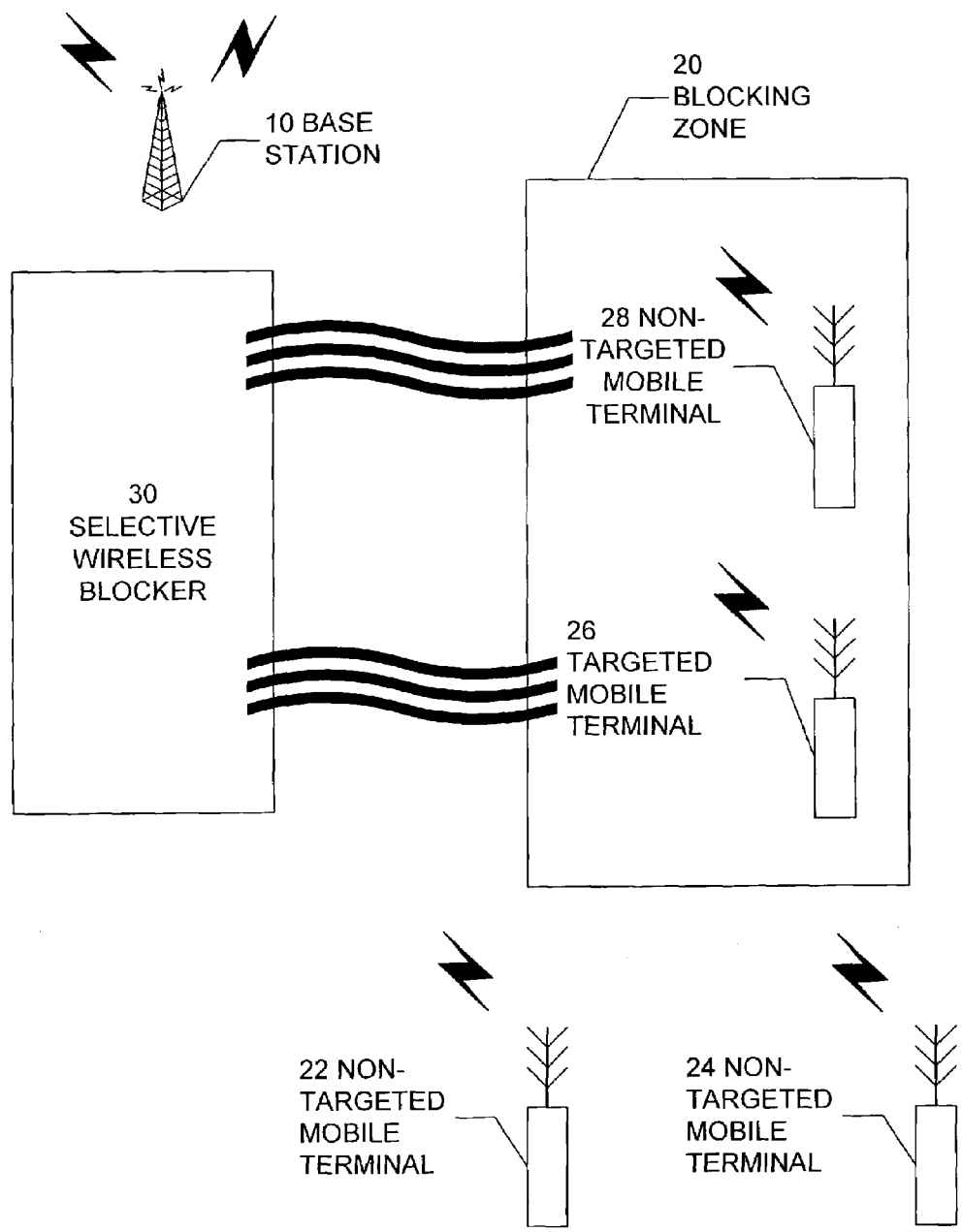
FIG. 2 illustrates mobile terminals within a blocking zone when blocking is present according to an embodiment of the present invention.

Referring to FIG. 2, the targeted mobile terminal 26 attempts to establish a link with its carrier by transmitting a signal over a reverse link, including by way of example and not as a limitation, a call origination signal. The present invention, selective wireless blocker 30, detects the transmission and sends a blocking response (wavy lines) disabling communications for targeted mobile terminal 26 within the blocking zone. In the example as illustrated, two non-targeted mobile terminals 22, 24 outside the blocking zone and actively in a wireless communication do not lose their connectivity while a non-targeted mobile terminal within the blocking zone is blocked 28. In an alternate embodiment, discussed below in reference to FIG. 4, the blocking response comprises detecting the coding protocol used by the targeted mobile terminal 26 and delivering a blocking response that disrupts the coding protocol. In this embodiment, the communications of non-targeted mobile terminal 28 will be blocked only if it uses the same coding protocol as targeted mobile terminal 26. In yet another embodiment, when targeted mobile terminal 26 ceases transmission of call origination signal, the selective wireless blocker 30 stops transmission of the blocking response.

Figure 3:
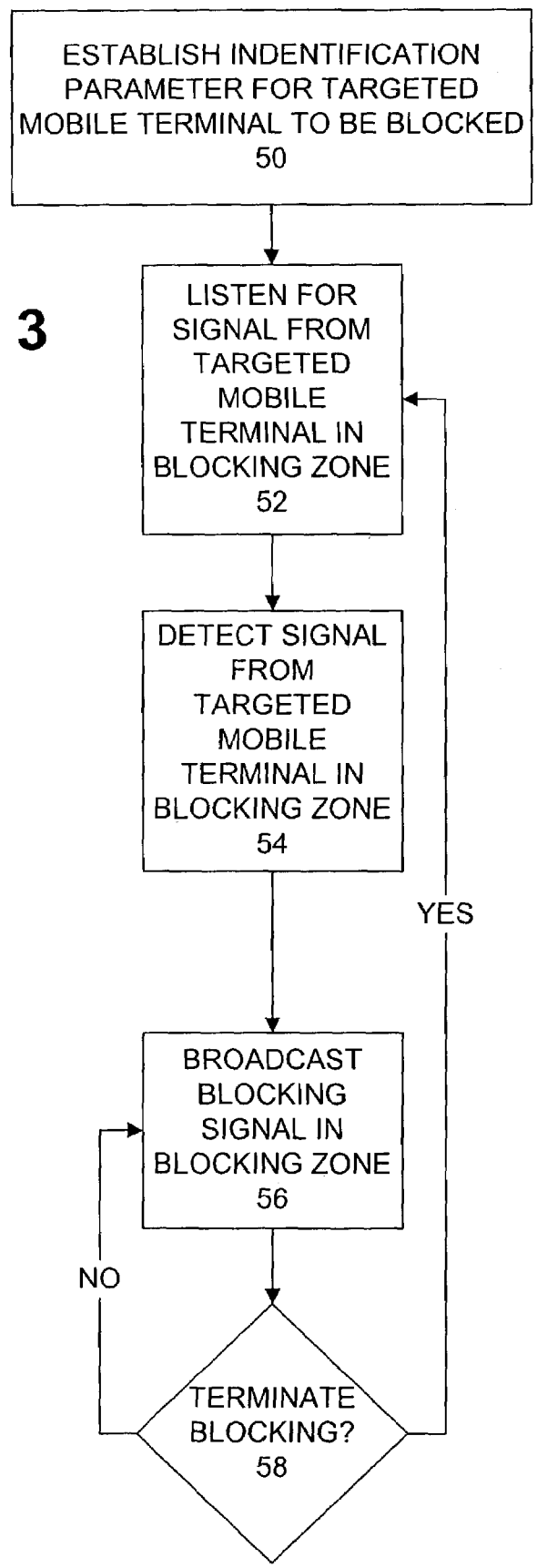
FIG. 3 illustrates a logic flow for blocking implementation according to an embodiment of the present invention.

Referring now to FIG. 3, a logic flow for blocking a cell phone according to an embodiment of the present invention is illustrated. One or more identification parameters of the targeted mobile terminal are established 50. A targeted mobile terminal may be targeted for any reason. For example, it may be targeted because of its Mobile ID, or the phone number it is calling, however, this is not meant as a limitation. An operator in one embodiment of the present invention establishes these parameters. The present invention, the wireless blocker, listens for a signal from the targeted mobile terminal 52 within the blocking zone.

Upon detection of a signal from the targeted mobile terminal 54, a blocking response is initiated 56 within the blocking zone. A determination is made whether to terminate the blocking response 58. For example, a timer may be checked to determine if a sufficient length of time has passed such that the call initiation will timeout, or the mobile terminal's signal may be monitored until the call initiation activity ceases 58, however these examples are not meant as limitations. If the termination criteria are satisfied, the process returns to a listening state 52. If the termination criteria have not been met, the blocking response 56 is continued. Once the targeted mobile terminal becomes quiescent the wireless blocker listens for a signal 52 until the targeted mobile terminal 54 makes a new attempt at a wireless communication.

Figure 4:
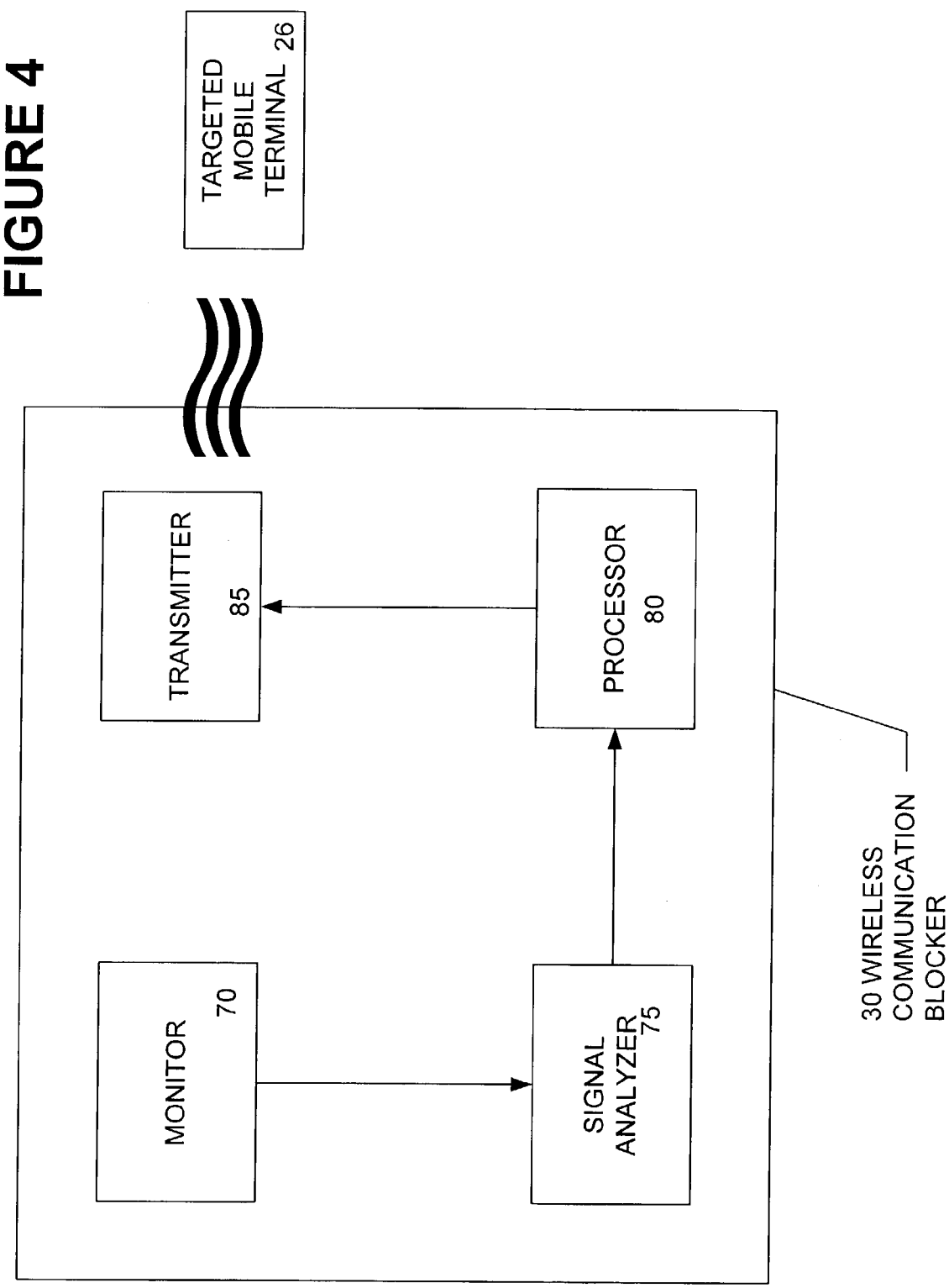
FIG. 4 illustrates an embodiment of a selective wireless communication blocker.

Referring to FIG. 4, a schematic diagram of an embodiment of a selective wireless blocker 30 is illustrated. Monitor 70 listens for signals from the targeted mobile terminal 26. Signals detected by the monitor are communicated to signal analyzer 75, which determines if a signal detected by the signal monitor is from the targeted mobile terminal 26, and if so the frequency of the signal, the modulation scheme of the signal, and the coding protocol used by the signal. The signal information from targeted mobile terminal 26 is then sent to processor 80 where instructions for responding to such signals determine the blocking response taken by the selective wireless blocker 30. The blocking response selected by processor 80 is initiated by transmitter 85. The transmitter transmits a signal that interferes with the ability of targeted mobile terminal 30 ability to initiate or complete a transmission within a blocking zone.

In one embodiment of the present invention, the blocking response comprises determining the transmission frequency used by the targeted mobile terminal 26 and transmitting a blocking signal that interferes with transmissions in a range around the frequency used by the targeted mobile terminal 26.

In still a further embodiment of the present invention, the blocking response comprises detecting the coding protocol used by the targeted mobile terminal 26 and delivering a blocking response that disrupts the coding protocol. For example, CDMA requires an accurate global time source for decoding adjustment, so a blocking response that transmits an inaccurate time to the targeted mobile terminal 26 will effectively disable the decoder of the targeted mobile terminal 26.

The blocking response is directed at the targeted mobile terminal 26. In order to limit the blocking response spatially to a blocking zone, in yet another embodiment of the present invention, the power level of the transmitter is set to the minimum level necessary to deliver a successful blocking response. In another embodiment, the processor 80 dynamically changes the power of the signal transmitted. In still another embodiment, the transmitter is incorporates discrete power amplifiers of different outputs for varying the range of the blocking response.

In a further embodiment of the present invention, positioning logic determines, within a narrow range, the location of the targeted mobile terminal 26. The location of the targeted mobile terminal 26 is determined in one embodiment of the present invention by employing multiple monitors and using a triangulation method to calculate the position of targeted mobile terminal 26. Another embodiment of the present invention determines the position of targeted mobile terminal 26 using a global positioning system. In either embodiment, the blocking response is adjusted to the minimum power level needed to deliver a successful blocking response. In an alternative embodiment, transmitter 85 comprises a plurality of transmitters that are adapted to direct intersecting signals at targeted mobile terminal 26. Blocking only occurs at the confluence of the two (or more) blocking transmissions. In another embodiment, the plurality of transmitters are physically separated but still controlled by processor 80.

A further embodiment of the present invention allows communication to a personal computer to provide the system manager logged information and control over setup parameters and co-ordination with other selective cellular blockers. In this embodiment, centralized digital signal processing is executed by the personal computer.

In an embodiment of the present invention, the processor 80 is adapted to determine when to start and stop the blocking response. In another embodiment, the blocking activity is continued for a fixed period of time. In still another embodiment, the blocking response continues for so long as the monitor 70 determines that the targeted mobile terminal 26 is attempting to transmit a signal.

The present invention is suited for any environment. In one embodiment, wireless blocker is packaged inside a metal water resistant locked enclosure to meet indoors and outdoors applications. In another embodiment, the wireless blocker is incorporated into a package resembling a suitcase, making it easily portable and non-conspicuous.

A selective wireless communication blocker has now been illustrated. It will be understood by those skilled in the art that the present invention may be embodied in other specific forms without departing from the scope of the invention disclosed and that the examples and embodiments described herein are in all respects illustrative and not restrictive. Those skilled in the art of the present invention will also recognize that other embodiments using the concepts described herein are also possible.

What is claimed is:

1. A method for selectively blocking communication within a blocking zone, wherein the method comprises:
   detecting from a targeted mobile terminal a call origination signal;
   determining a frequency of a response signal from a base station;
   determining a blocking signal power measured at the call origination signal location necessary to block the call origination signal at the response signal frequency;
   determining a blocking response tailored to the call origination signal of the targeted mobile terminal;
   transmitting a blocking signal comprising the blocking response at the response signal frequency and at the blocking signal power; and
   limiting the blocking signal to the blocking zone, wherein the blocking zone comprises an area proximate to the targeted mobile terminal.

2. A method for selectively blocking communication within a blocking zone, wherein the method comprises:
   detecting from a targeted mobile terminal a call origination signal;
   determining a blocking response;
   transmitting a blocking signal comprising the blocking response; and
   limiting the blocking signal to the blocking zone, wherein the blocking zone comprises an area proximate to the targeted mobile terminal, and
   wherein limiting the blocking signal to the blocking zone comprises:
   determining a call origination signal location;
   determining the power of a blocking signal measured at the call origination signal location necessary to block the call origination signal; and
   transmitting the blocking signal with sufficient power to achieve the blocking signal power at the call origination signal location.

3. The method of claim 2, wherein transmitting the blocking signal with sufficient power to achieve the blocking signal power at the call origination signal location comprises transmitting the blocking signal from a plurality of transmitters wherein the cumulative strength of the blocking signal at the call origination signal location from the plurality of transmitters is substantially equal to the blocking signal power.

4. A method for selectively blocking communication within a blocking zone, wherein the method comprises:
   detecting from a targeted mobile terminal a call origination signal;
   determining a blocking response;
   transmitting a blocking signal comprising the blocking response; and
   limiting the blocking signal to the blocking zone, wherein the blocking zone comprises an area proximate to the targeted mobile terminal, and
wherein limiting the blocking signal to the blocking zone comprises:
   ceasing transmission of the blocking signal after expiration of a blocking period;
   monitoring the targeted mobile terminal for a call origination signal; and
   transmitting the blocking signal for the blocking period if the call origination signal is present.

5. A method for selectively blocking communication within a blocking zone, wherein the method comprises:
   detecting from a targeted mobile terminal a call origination signal;
   determining a blocking response;
   transmitting a blocking signal comprising the blocking response; and
   limiting the blocking signal to the blocking zone;
   wherein determining the blocking response comprises determining a coding scheme of the targeted mobile terminal; and
   wherein transmitting a blocking signal comprising a blocking response comprises transmitting a blocking signal comprising a code symbol wherein receipt of the code symbol by the targeted mobile terminal disrupts the coding scheme of the targeted mobile terminal so as to preclude the mobile terminal from processing a response signal sent by a base station.

6. The method of claim 5, wherein the code symbol comprises a time reference mark of the base station.

7. A selective wireless communication blocker comprising:
   a monitor adapted to detect call origination signals transmitted by a targeted mobile terminal;
   a signal analyzer connected to the monitor so as to receive the call origination signals from the monitor, wherein the signal analyzer analyzes the call origination signals to selectively identify a call origination signal generated by a targeted mobile terminal and produces targeted mobile terminal data based on the analysis;
   at least one transmitter adapted to transmit a blocking signal when so instructed; and
   a processor connected to the signal analyzer so as to receive the targeted mobile terminal data, the processor executing software instructions adapted to cause the processor to perform the steps of:
      determining a blocking response tailored to the call origination signal; and
      instructing the at least one transmitter to send a blocking signal comprising the blocking response, wherein the blocking signal is limited to a blocking zone.

8. The selective wireless communication blocker as in claim 7, wherein determining the blocking response comprises determining a range of probable frequencies of a response signal from a base station, and wherein instructing the at least one transmitter to send a blocking signal comprising the blocking response wherein the blocking signal is limited to a blocking zone comprises instructing the at least one transmitter to transmit a blocking signal comprising the range of probable frequencies of a response from a base station.

9. A selective wireless communication blocker comprising:
   a monitor adapted to detect call origination signals transmitted by a targeted mobile terminal;
   a signal analyzer connected to the monitor so as to receive the call origination signals from the monitor, wherein the signal analyzer analyzes the call origination signals to selectively identify a call origination signal generated by a targeted mobile terminal and produces targeted mobile terminal data based on the analysis;
   at least one transmitter adapted to transmit a blocking signal when so instructed; and
   a processor connected to the signal analyzer so as to receive the targeted mobile terminal data, the processor executing software instructions adapted to cause the processor to perform the steps of:
      determining a blocking response based on the received targeted mobile terminal data, and
      instructing the at least one transmitter to send a blocking signal comprising the blocking response, wherein the blocking signal is limited to a blocking zone;
   wherein determining the blocking response comprises determining a coding scheme used by the targeted mobile terminal, and
   wherein instructing the at least one transmitter to send a blocking signal comprising the blocking response wherein the blocking signal is limited to a blocking zone comprises instructing the at least one transmitter to transmit a blocking signal comprising a code symbol wherein receipt of the code symbol by the targeted mobile terminal disrupts the coding scheme of the targeted mobile terminal so as to preclude the mobile terminal from processing a response signal sent by a base station.

10. The selective wireless communication blocker as in claim 9, wherein the code symbol comprises a time reference mark of the base station.

11. A selective wireless communication blocker comprising:
   a monitor adapted to detect call origination signals transmitted by a targeted mobile terminal;
   a signal analyzer connected to the monitor so as to receive the call origination signals from the monitor, wherein the signal analyzer analyzes the call origination signals to selectively identify a call origination signal generated by a targeted mobile terminal and produces targeted mobile terminal data based on the analysis;
   at least one transmitter adapted to transmit a blocking signal when so instructed; and
   a processor connected to the signal analyzer so as to receive the targeted mobile terminal data, the processor executing software instructions adapted to cause the processor to perform the steps of:
      determining a blocking response based on the received targeted mobile terminal data, instructing the at least one transmitter to send a blocking signal comprising the blocking response, wherein the blocking signal is limited to a blocking zone;

instructing the at least one transmitter to cease sending a blocking signal after a blocking period;

determining if the targeted mobile terminal is sending the call origination signal; and instructing the at least one transmitter to transmit a blocking signal if the mobile terminal is sending the call origination signal.

12. A selective wireless communication blocker comprising:

a monitor adapted to detect call origination signals transmitted by a targeted mobile terminal;

a signal analyzer connected to the monitor so as to receive the call origination signals from the monitor, wherein the signal analyzer analyzes the call origination signals to selectively identify a call origination signal generated by a targeted mobile terminal and produces targeted mobile terminal data based on the analysis;

at least one transmitter adapted to transmit a blocking signal when so instructed; and a processor connected to the signal analyzer so as to receive the targeted mobile terminal data, the processor executing software instructions adapted to cause the processor to perform the steps of:

determining a blocking response based on the received targeted mobile terminal data, determining a call origination signal location, determining the power of a blocking signal measured at the call origination signal location necessary to block the call origination signal, and instructing the at least one transmitter to send a blocking signal to the call origination signal location, wherein the blocking signal is transmitted with sufficient power to achieve the blocking signal power at the call origination signal location.

13. A selective wireless communication blocker comprising:

a monitor adapted to detect call origination signals transmitted by a targeted mobile terminal;

a signal analyzer connected to the monitor so as to receive the call origination signals from the monitor, wherein the signal analyzer analyzes the call origination signals to selectively identify a call origination signal generated by a targeted mobile terminal and produces targeted mobile terminal data based on the analysis;

a plurality of transmitters adapted to transmit a blocking signal when so instructed; and a processor connected to the signal analyzer so as to receive the targeted mobile terminal data, the processor executing software instructions adapted to cause the processor to perform the steps of:

determining a blocking response based on the received targeted mobile terminal data, determining a call origination signal location, determining the power of a blocking signal measured at the call origination signal location necessary to block the call origination signal, and instructing the plurality of transmitters to send a blocking signal to the call origination signal location, wherein the power of the blocking signal from all transmitters is sufficient, at the call origination signal location, to achieve the blocking signal power.

* * * * *